(12) United States Patent
Puttagunta et al.

(10) Patent No.: US 10,880,205 B1
(45) Date of Patent: Dec. 29, 2020

(54) DETERMINING PATH INFORMATION IN A COMPUTING NETWORK

(71) Applicant: Hewlett Packard Enterprise Development LP, Houston, TX (US)

(72) Inventors: Krishna Babu Puttagunta, Roseville, CA (US); Rupin Mohan, Andover, MA (US); Vivek Agarwal, Andover, MA (US); Curtis C. Ballard, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/525,675

(22) Filed: Jul. 30, 2019

(51) Int. Cl.
*H04L 12/703* (2013.01)
*H04L 12/707* (2013.01)
*H04L 12/26* (2006.01)

(52) U.S. Cl.
CPC .......... *H04L 45/28* (2013.01); *H04L 43/0811* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 6,904,477 B2 * | 6/2005 | Padmanabhan ....... | G06F 3/0617 710/74 |
| 9,785,355 B2 | 10/2017 | Huang | |
| 10,686,729 B2 * | 6/2020 | Sindhu ................... | H04L 45/22 |
| 2015/0304423 A1 | 10/2015 | Satoyama et al. | |
| 2018/0081558 A1 | 3/2018 | Ish et al. | |

FOREIGN PATENT DOCUMENTS

CN 106095329 A 11/2016

OTHER PUBLICATIONS

NetApp, Inc., "NVMe namespaces," available online at <https://docs.netapp.com/ontap-9/index.jsp?topic=%2Fcom.netapp.doc.onc-sm-help-930%2FGUID-19692EAA-74FA-47EF-9FA3-5CD0134FD7FE.html>, Aug. 2018, ONTAP 9 Documentation Center, 1 page.
Anderson et al.. "SCSI Mid-Level Multipath," Jul. 2003, Proceedings of the Linux Symposium, <http://landley.net/kdocs/ols/2003/ols2003-pages-23-33.pdf>.
Broadcom, "Brocade Fabric OS Administration Guide, 8.2.0a," (Technical Paper), May 10, 2018, https://docs.broadcom.com/docs/53-1005237-05?eula=true.
Christophe Varoqui, "The Linux multipath implementation," Dec. 2010, <http://christophe.varoqui.free.fr/refbook.html>.
Peppers, M. et al., "Implementing and Configuring Modern SANs with NVMe/FC," Nov. 2018, https://www.netapp.com/us/media/tr-4684.pdf.
VMWARE, Inc., "vSphere Storage," Nov. 9, 2018, https://docs.vmware.com/en/VMware-vSphere/6.7/vsphere-esxi-vcenter-server-67-storage-guide.pdf.pdf.
Wikipedia, "Linux DM Multipath," Nov. 12, 2016, <https://en.wikipedia.org/w/index.php?title=Linux_DM_Multipath&oldid=749086708>.

\* cited by examiner

*Primary Examiner* — Hong S Cho
(74) *Attorney, Agent, or Firm* — Trop, Pruner & Hu, P.C.

(57) ABSTRACT

In one implementation, a non-transitory machine-readable storage medium may store instructions that upon execution cause a processor to: determine, by a network device, path information for a plurality of paths in a computing fabric, the path information identifying alternative paths to access namespaces; determine, by the network device, a first portion of the path information that is associated with a first host; and provide, by the network device the first portion of the path information to the first host.

20 Claims, 8 Drawing Sheets

DETERMINING PATH INFORMATION IN A COMPUTING NETWORK

BACKGROUND

A computing network can include any number of devices connected by data links. Some computing networks may be specialized to perform specific types of tasks. For example, a Storage Area Network (SAN) is generally configured to enable computing devices to access to data storage devices such as storage arrays, tape libraries, etc.

BRIEF DESCRIPTION OF THE DRAWINGS

Some implementations are described with respect to the following figures.

DETAILED DESCRIPTION

In information technology (IT) systems, various types of devices may communicate data via a network fabric. For example, a computing device may access a particular data location on a storage device via a path across the network fabric. However, in the event that this path suffers a fault, the computing device may lose access to the data location. As such, the computing device may have to perform actions to establish an alternative path to restore or maintain access to the data location.

In some network systems (e.g., NVM Express™ over Fabrics (NVMe-oF™) systems), each computing device or host may have to separately execute a discovery process to determine network information (e.g., devices, namespaces, paths, and so forth). As used herein, "namespace" refers to an address space of a physical or logical unit of storage (e.g., a volume, or the like). In such examples, the addresses of a given namespace may reference and be used to access locations in the unit of storage at which data may be stored. Further, each host must separately determine alternative paths to namespaces and update network information to reflect changes in the network (e.g., device faults, added devices, changed paths, etc.). In some systems, such discovery and update processes performed by each host may affect the performance of each host, and may reduce available bandwidth in the network.

As described further below with reference to FIGS. 1-8, some implementations may provide a network service to identify paths in a network. In some examples, a network device may discover paths in the network, and may store path information in persistent storage. As used herein, "path information" refers to any suitable information representing physical or logical paths to particular namespaces. For example, the path information may identify each path as a tuple of information including a host, a host port, a target, target port, a namespace, and so forth. The network device may determine portions of the path information that are associated with different hosts, and may provide the various portions to their associated hosts. Each host can use the provided portion to select from a set of alternative paths to namespaces. As used herein, "alternative paths" refers to two or more different paths that can be used to access a given namespace. As used herein, "alternative path information" refers to any suitable information representing a plurality of alternative paths. In some examples, using the network device to determine path information may reduce or eliminate the discovery processes performed by each host. In this manner, the processing load on each host may be reduced, which may improve the performance of the host. Further, in some examples, the network bandwidth associated with determining paths may be reduced. Furthermore, in some examples, using the network device to detect faults may reduce the time period required to respond to faults in network paths. In some examples, the path discovery performed by the network device is compatible with multiple operating systems, and processing load may be reduced.

Figure 1:
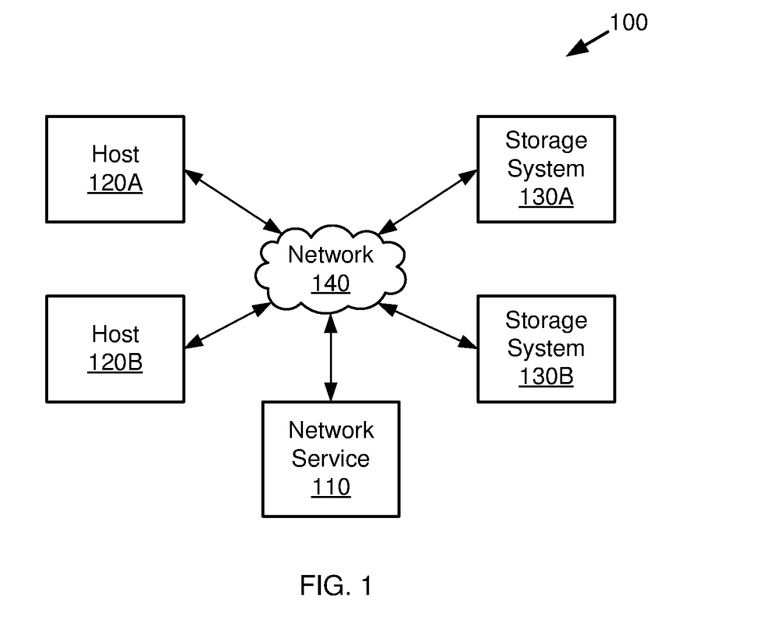
FIG. 1 is a schematic diagram of an example system, in accordance with some implementations.

FIG. 1 is a schematic diagram of an example system 100, in accordance with some implementations. As shown, the system 100 may include hosts 120A, 120B, a network service 110, and storage systems 130A, 130B connected via a network 140. The hosts 120 may include computing devices such as servers, desktop computers, appliances, and so forth. The storage systems 130 may include storage devices such as non-volatile memory devices, disk arrays, and so forth. The storage systems 130 may also be referred to herein as "storage subsystems 130."

In some implementations, the hosts 120 and the storage systems 130 may be implemented in separate housings, devices, locations, and so forth. In some examples, at least one host 120 and at least one storage system 130 may be implemented in a single housing, device, rack, and so forth. The network service 110 may be implemented in a hardware device (e.g., a network switch, a server), in a virtual environment (e.g., in a virtual server, a container, etc.), or in any other platform. In an implementation using a NVM Express™ (NVMe™) protocol, the network service 110 may be implemented in a specialized server (referred to herein as a "NVMe™ server" or "NS"). In some examples, the elements of the system 100 may be divided into various groupings or domains.

In some implementations, the network service 110 may identify paths to namespaces in the storage systems 130. For example, the network service 110 may perform discovery of all or a portion of the hosts 120 and storage systems 130. Such discovery may include obtaining information about all or a portion of the hosts 120 and storage systems 130, including device configuration, storage configuration, namespaces, data locations, network connections, status, performance, and so forth. In some examples, the network service 110 may obtain discovery information by polling the hosts 120 and storage systems 130. Further, the network service 110 may generate path information based on this discovery, and may store the path information in persistent storage. In some implementations, for each host 120, the network service 110 may determine a portion of the path information that is associated with that host 120. For example, the network service 110 may determine a set of paths and/or namespaces that can be accessed by host 120A, and may provide host 120A with only the portion of the path information that is related to these paths and/or namespaces. In this manner, the hosts 120 can use their respective portions of the path information without having to separately perform discovery and update processes. Various aspects of the network service 110 are discussed further below with reference to FIGS. 2-8.

Figure 2:
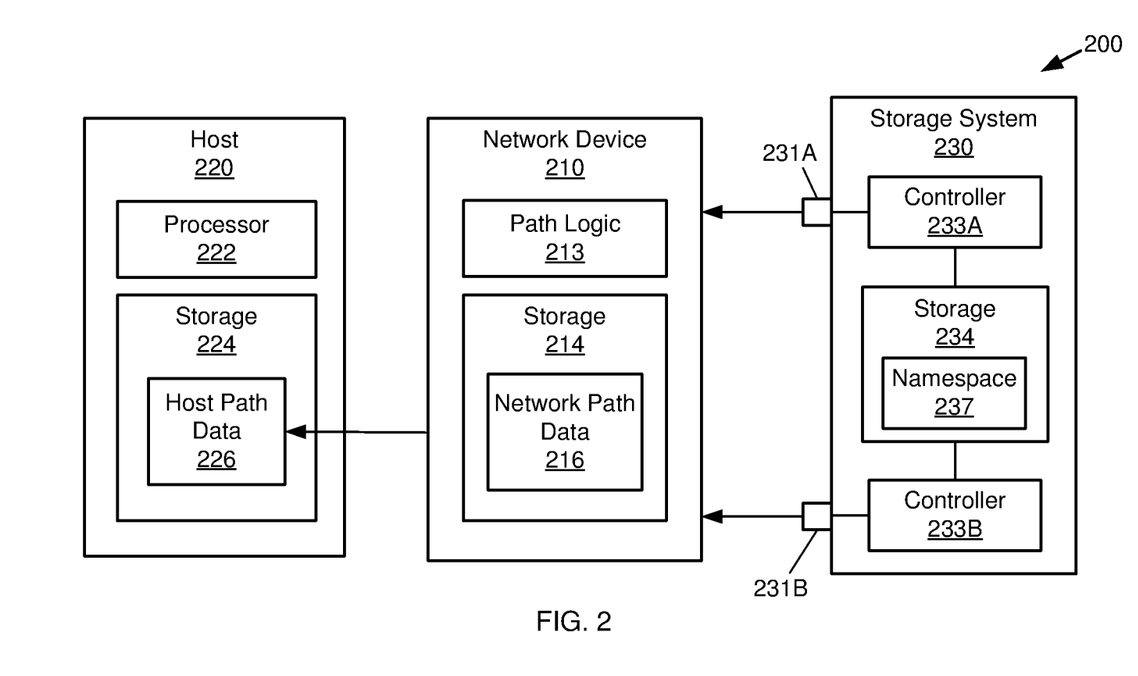
FIG. 2 is an illustration of an example system, in accordance with some implementations.

Referring now to FIG. 2, shown is an example system 200 in accordance with some implementations. As shown, the system 200 may include a network device 210, host 220, and storage system 230. The system 200 may correspond generally to an example implementation of the system 100 (shown in FIG. 1). For example, the network device 210 may be an example implementation of the network service shown in FIG. 1. Note that the system 200 is not intended to limit implementations, and other variations are possible. In some examples, the system 200 may implement a NVMe™ protocol. However, other implementations are also possible.

In some implementations, the network device 210 may include path logic 213 and storage 214. The path logic 213 may be implemented in hardware, or in a combination of hardware and software (e.g., stored instructions executed by a processor). In some implementations, the path logic 213 may provide a network service to identify paths in a network. The host 220 may include a processor 222 and storage 224. The storage system 230 includes controllers 233A, 233B and storage 234. In some examples, the storage system 230 may be implemented in a single housing or enclosure. The storage system 230 may also be referred to herein as a "storage subsystem 230." The storage 214, storage 224, and/or storage 234 may include non-volatile memory, magnetic media, optical media, and so forth.

In some implementations, the path logic 213 may determine path information for respective namespaces (e.g., each for a plurality of data locations). For example, the path logic 213 may poll the storage system 230 to identify a namespace 237 of a unit of storage 234, and may determine each path to access the namespace 237 (e.g., via port 231A and controller 233A). In some examples, the host 220 does not poll the storage system 230. In some implementations, the path logic 213 may generate the network path data 216 based on the determined path information, and may store the network path data 216 in the storage 214. In examples described herein, the unit of storage 234 may be implemented by one or more physical storage device(s) of any suitable type (e.g., solid state drive(s) (SSD(s)), hard disk drive(s) (HDD(s)), or the like, or a combination thereof). In some examples, the unit of storage 234 may be implemented by one or more virtual units of storage (e.g., virtual volume(s)) backed by physical storage that may be implemented by one or more physical storage device(s) of any suitable type.

In some implementations, the path logic 213 may determine a portion of the network path data 216 that is associated with the host 220. For example, the path logic 213 may determine that the host 220 and the storage system 230 are both included in a defined grouping or association (e.g., a discovery domain), and may thus include path information for the storage system 230 in the portion associated with the host 220. In another example, the path logic 213 may determine the portion associated with the host 220 based on ownership and/or security characteristics of the host 220 (e.g., permissions of the host 220 to access a namespace). In some examples, the portion of the network path data 216 associated with host 220 may include full network paths from host 220 to various namespaces.

In some implementations, the path logic 213 may provide the determined portion to the host 220. As shown in FIG. 2, the host 220 may store the provided portion as host path data 226 in persistent storage 224. In some examples, the host path data 226 may only include information for paths that are associated with the host 220. In some examples, the network path data 216 and/or host path data 226 may be implemented in one or more organized data structures (e.g., tables, extensible markup language (XML) files, flat files, and so forth).

In some implementations, the path logic 213 may identify alternative paths to access namespaces. For example, the path logic 213 may determine that two different paths can access the same namespace 237, namely a first path including port 231A and controller 233A, and a second path including port 231B and controller 233B. In some implementations, the path logic 213 may provide an indication that two or more paths are alternative paths. For example, the path logic 213 may set a field or flag in the network path data 216 to indicate that the two paths are alternative paths to the same namespace 237. In some examples, these two alternative paths may be indicated in the network path data 216 by associating a code or identifier of namespace 237 with each of the alternative paths. In another example, a data structure may be updated to include a list of pointers to paths that have been identified as alternative paths to various namespaces.

In some implementations, the path logic 213 may provide the host 220 with data (stored as host path data 226) that includes all paths associated with the host 220, and in which paths to the same namespace are indicated as alternative paths to each other. In other implementations, the path logic 213 may provide host 220 with data that only includes alternative paths. In still other implementations, the data provided to the host 220 may include information regarding all paths associated with the host 220, and the host 220 may use the path information to identify alternative paths.

In some examples, using the network device 210 to determine path information and/or alternative paths may reduce or eliminate the discovery processes performed by each host. In this manner, the processing load on each host may be reduced, which may improve the performance of the host. Further, because using the network device 210 means that each of multiple hosts is not separately polling to determine path information, the network bandwidth associated with determining paths may be reduced. Furthermore, in some examples, the network device 210 may detect path faults more rapidly than individual hosts. Accordingly, using the network device to detect faults may reduce the time period required to respond to faults in network paths.

Figure 3:
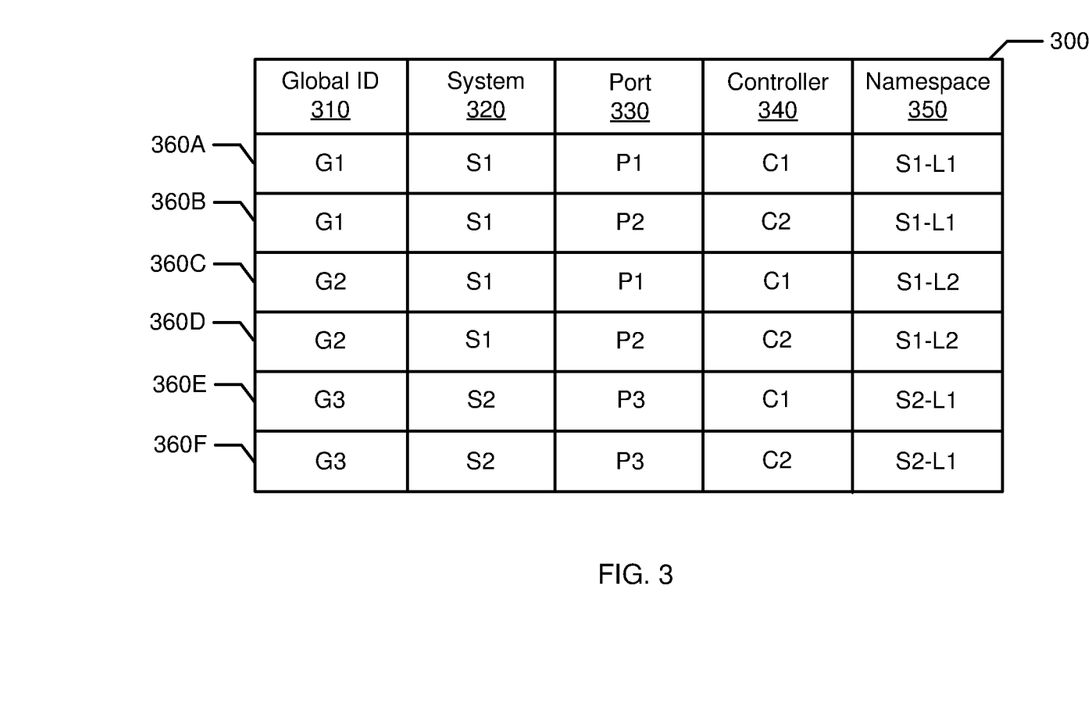
FIG. 3 is an illustration of an example data structure, in accordance with some implementations.

Referring now to FIG. 3, shown is a diagram illustrating an example path data structure 300. The path data structure 300 may correspond generally to an example implementation of the entries of the network path data 216 and/or the host path data 226 (shown in FIG. 2). In some implementations, the path data structure 300 may include multiple entries 360A-360F (also referred to as "entries 360") that each correspond to a single path identified by a network device (e.g., by network device 210 shown in FIG. 2).

In some implementations, each entry 360 may include a global ID field 310, a system field 320, a port field 330, a controller field 340, and/or a namespace field 350. The global ID field 310 may include an identifier for a particular namespace, where the identifier is globally unique across an entire network system (e.g., system 100 shown in FIG. 1). The system field 320 may identify a particular storage system in a path (e.g., storage system 230 shown in FIG. 2). For example, in a NVMe™ implementation, the global ID field 310 may store a Namespace Globally Unique Identifier (NGUID), and the system field 320 may store a NVMe™ Qualified Name (NQN).

The port field 330 may identify a particular port included in a path (e.g., port 231A shown in FIG. 2). In some examples, the identified port may be included in the storage system identified in the system field 320. The controller field 340 may identify a particular controller included in a path (e.g., controller 233A shown in FIG. 2). In some examples, the identified controller may be included in the storage system identified in the system field 320. The namespace field 350 may include an identifier for a namespace, where the identifier is unique for a particular controller. For example, in a NVMe™ implementation, the namespace field 350 may store a namespace identifier (NSID).

In some implementations, the path data structure 300 may be generated and/or updated using path information determined by a network service (e.g., provided by path logic 213 shown in FIG. 2). Further, the path data structure 300 may be used to identify sets of alternative paths in a network. For example, as shown in FIG. 3, the entries 360A and 360B correspond to two different paths to access the namespace L1 in the system S1. Further, the entries 360C and 360D correspond to two different paths to access the namespace L2 in system S1. Furthermore, the entries 360E and 360F correspond to two different paths to access the namespace L1 in system S2.

Note that, in the example of FIG. 3, two systems S1 and S2 each include the namespace identifier "L1," but these are different namespaces in separate systems. Accordingly, the global ID values "G1" and "G3" associated with these two namespaces are different. In some implementations, alternative paths may be identified when two or more entries indicate different paths for the same global ID 310. Further, in some implementations, alternative paths may be identified when two or more entries indicate different paths for the same combination of system 320 and namespace 350. Note that, while FIG. 3 shows an example implementation of the path data structure 300, other implementations are possible. For example, the path data structure 300 may include additional fields (e.g., to indicate alternative paths), fewer fields, different fields, and so forth.

Figure 4:
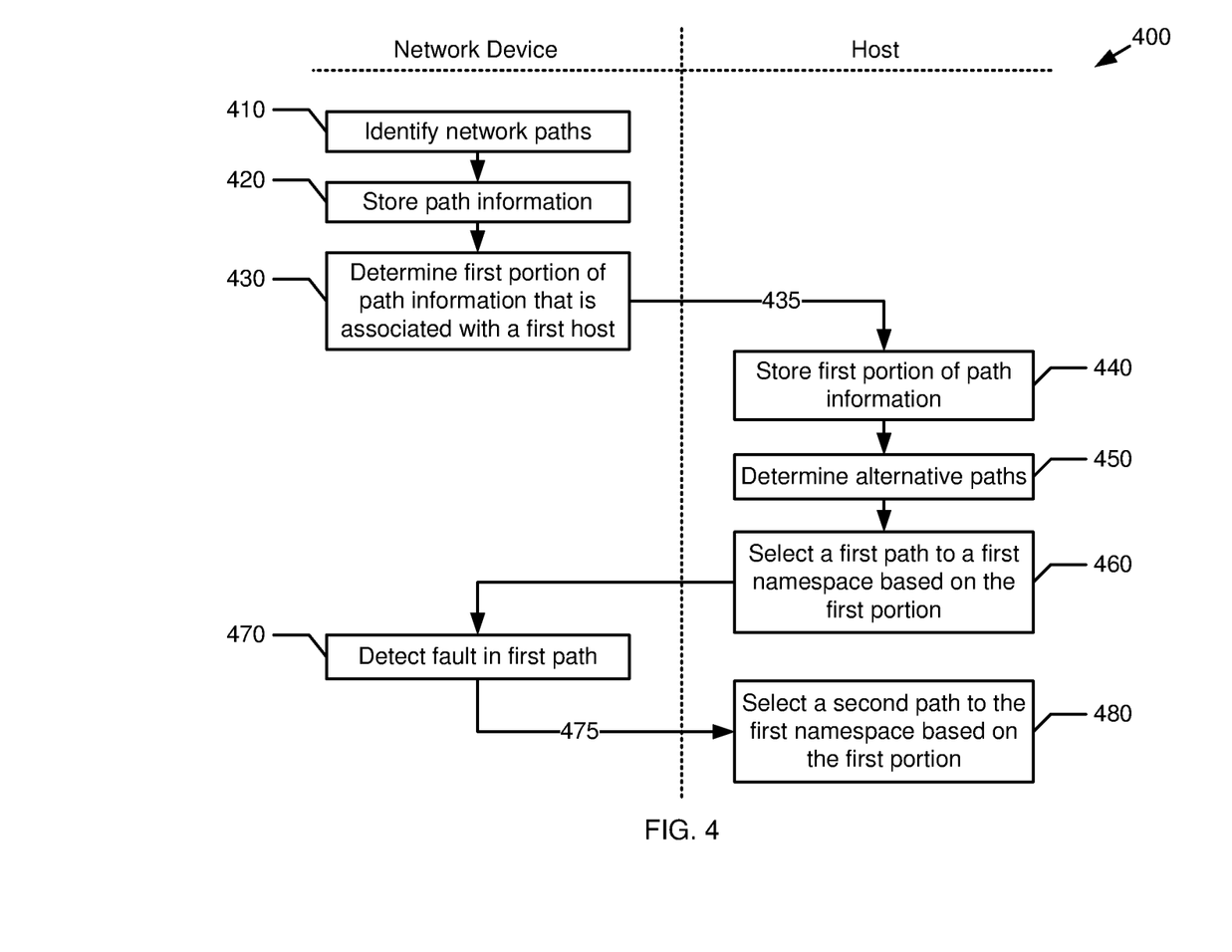
FIG. 4 is an illustration of an example process, in accordance with some implementations.

Referring now to FIG. 4, shown is an example process 400, in accordance with some implementations. Note that the process 400 is illustrated in FIG. 4 as being divided into two portions, namely a set of actions performed by a network device (e.g., network device 210 shown in FIG. 2) in the left portion of FIG. 4, and a set of actions performed by a host (e.g., host 220 shown in FIG. 2) in the right portion of FIG. 4. However, implementations are not limited by FIG. 4, and other examples are also possible. The process 400 may be implemented in hardware or machine-readable instructions (e.g., software and/or firmware) executable by hardware. Such machine-readable instructions may be stored in a non-transitory computer readable medium, such as an optical, semiconductor, or magnetic storage device. For the sake of illustration, details of the process 400 may be described below with reference to FIGS. 1-3, which show examples in accordance with some implementations. However, other implementations are also possible.

Block 410 may include a network device identifying paths in a computing network. For example, referring to FIG. 1, the network service 110 may identify the hosts 120, the storage systems 130, namespaces, data locations, network connections, and so forth. The network service 110 may be implemented in a switch, server, virtual server, a name server, and so forth. In some implementations, the network service 110 may identify network paths by polling other devices in the network. For example, referring to FIG. 2, the network device 210 may poll the storage system 230 to identify the paths to access the namespace 237. Further, in some examples, all discovery polling may be performed by the network device 210.

Block 420 may include the network device storing path information in persistent storage. For example, referring to FIG. 2, the network device 210 may use the determined path information to generate and/or update the network path data 216 stored in the storage 214.

Block 430 may include the network device determining a first portion of the path information that is associated with the host. Arrow 435 indicates that the network device may provide the first portion to the host. Block 440 may include the host storing the first portion of the path information. For example, referring to FIG. 2, the network device 210 may determine a first portion of the network path data 216 that is associated with the host 220 (e.g., based on shared membership in a discovery domain, ownership characteristics of the host 220, security characteristics of the host 220, and so forth). In some examples, the network device 210 may send the first portion to the host 220 (e.g., via a network link or interconnection). In other examples, the network device 210 may send a notification of the first portion to the host 220 (e.g., an indication of an address or range), and the host 220 may then read or access the first portion from the network device 210. The host 220 may store the first portion in the storage 224 (e.g., as the host path data 226).

Block 450 may include the host determining alternative paths to access namespaces. For example, referring to FIGS. 2-3, the host 220 may analyze the host path data 226 to identify multiple paths that access a single namespace (e.g., the namespace 237 included in the storage system 230). In some examples, the host 220 may determine alternative paths based on multiple entries 360 of the path data structure 300 that correspond to different paths to access the same namespace (e.g., the two paths of entries 360A and 360B that access the namespace L1 in the system S1). For example, sets of entries 360 indicating alternative paths may share the same global ID 310, may share the same combination of system 320 and namespace 350, and so forth.

Block 460 may include the host selecting a first path to a first namespace based on the first portion of the path information. For example, referring to FIG. 2, the host 220 may use the host path data 226 to select a first path (via port 231A and controller 233A) to access the namespace 237.

Block 470 may include the network device detecting a fault in the first path. Arrow 475 may indicate that the network device provides a notification of the fault in the first path to the host. Block 480 may include the host selecting a second path to the first namespace based on the first portion. For example, referring to FIG. 2, the network device 210 may determine that the first path to namespace 237 has suffered a fault (e.g., broken link, equipment fault, and so forth), and may then provide a fault notification to host 220. In response to the fault notification, the host 220 may use the host path data 226 to select an alternative path (via port 231B and controller 233B) to access namespace 237. Referring again to FIG. 4, after block 480, the process 400 may be completed.

Figure 5:
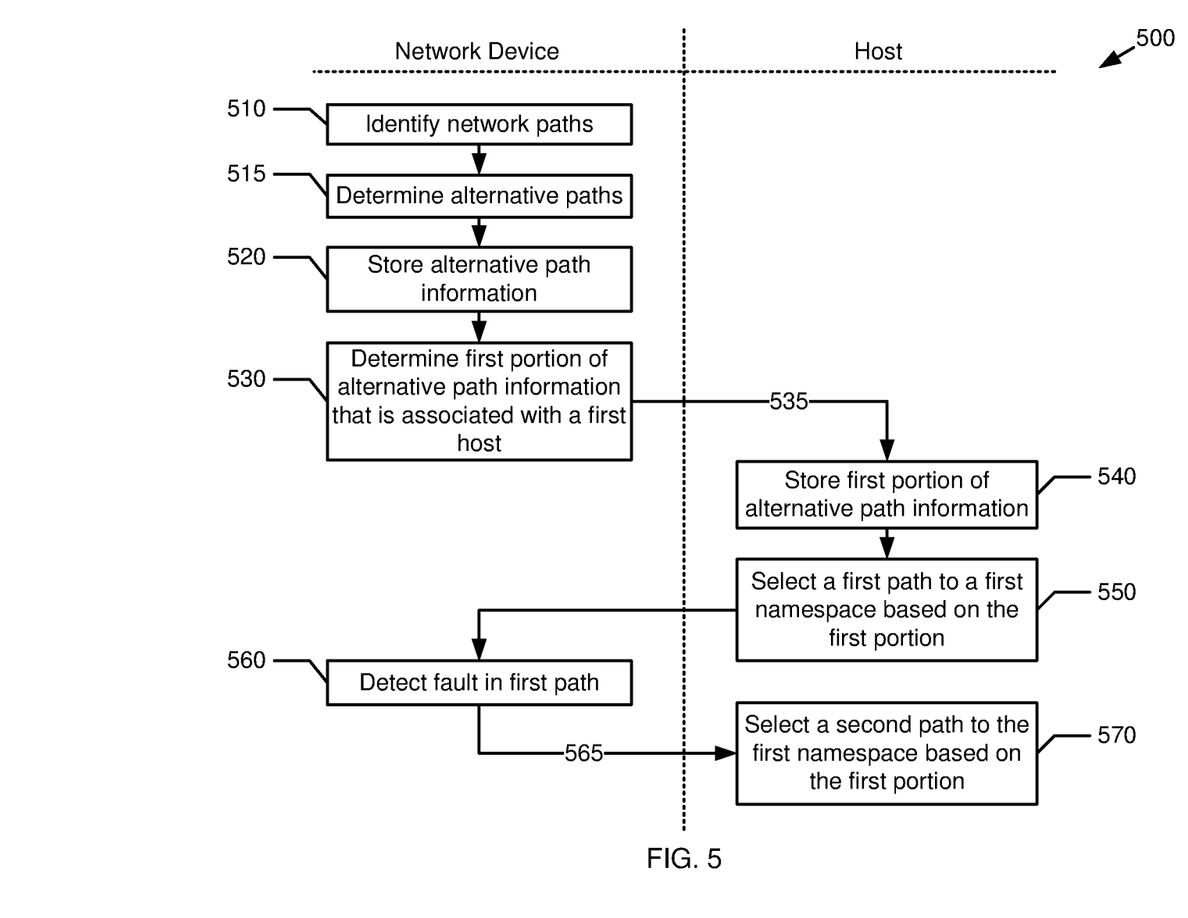
FIG. 5 is an illustration of an example process, in accordance with some implementations.

Referring now to FIG. 5, shown is an example process 500, in accordance with some implementations. The actions in the left portion of FIG. 5 may be performed by a network device (e.g., network device 210 shown in FIG. 2), and the actions in the right portion of FIG. 5 may be performed by a host (e.g., host 220 shown in FIG. 2). However, implementations are not limited by FIG. 5, and other examples are also possible. The process 500 may be implemented in hardware and/or machine-readable instructions (e.g., software and/or firmware).

Block 510 may include a network device identifying paths in a computing network. For example, referring to FIG. 2, the network device 210 may analyze the storage system 230 to identify the paths to access namespace 237.

Block 515 may include the network device determining alternative paths to access namespaces. For example, referring to FIGS. 2-3, the network device 210 may analyze path information to identify multiple paths that access a single namespace. In some examples, the network device 210 may determine alternative paths based on multiple entries 360 of the path data structure 300 that correspond to different paths to access the same namespace.

Block 520 may include the network device storing the alternative path information in persistent storage. For example, referring to FIG. 2, the network device 210 may store the determined alternative path information in the network path data 216 stored in the storage 214. In some examples, the network path data 216 may only include alternative paths. In other examples, the network path data 216 may include information about all paths, and may include indications of alternative paths (e.g., a field or flag indicating sets of alternative paths).

Block 530 may include the network device determining a first portion of the alternative path information that is associated with a first host. Arrow 535 indicates that the network device may provide the first portion of the alternative path information to the host. Block 540 may include the host storing the first portion of the of the alternative path information. For example, referring to FIG. 2, the network device 210 may determine a first portion of the alternative path information that is associated with the host 220, and may send the first portion of the alternative path information to the host 220. The host 220 may store the first portion of the alternative path information in the storage 224 (e.g., as the host path data 226).

Block 550 may include the host selecting a first path to a first namespace based on the first portion of the alternative path information. For example, referring to FIG. 2, the host 220 may use stored alternative path information to select a first path (via port 231A and controller 233A) to access the namespace 237.

Block 560 may include the network device detecting a fault in the first path. Arrow 565 may indicate that the network device provides a notification of the fault in the first path to the host. Block 570 may include the host selecting a second path to the first namespace based on the first portion of the alternative path information. For example, referring to FIG. 2, the network device 210 may provide a fault notification to host 220, and the host 220 may use alternative path information to select a second path (via port 231B and controller 233B). Referring again to FIG. 5, after block 570, the process 400 may be completed.

Figure 6:
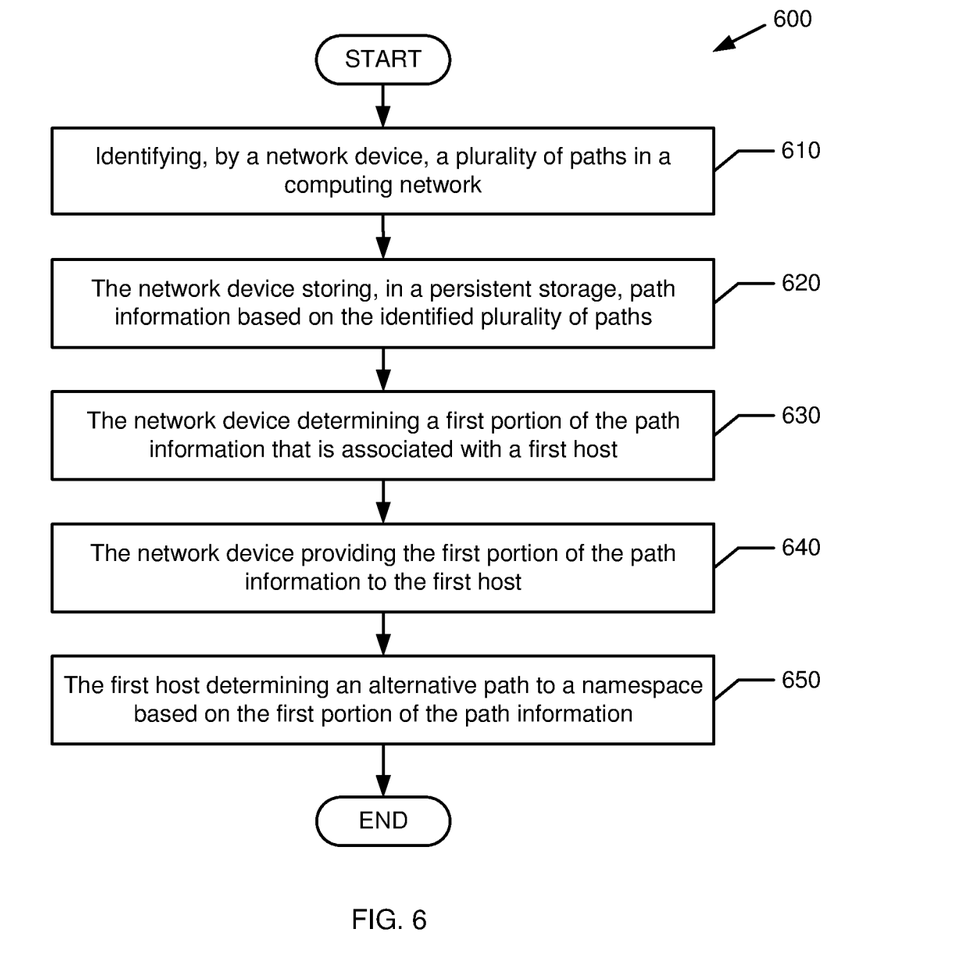
FIG. 6 is an illustration of an example process, in accordance with some implementations.

Referring now to FIG. 6, shown is an example process 600, in accordance with some implementations. The process 600 may be performed by the system 100 (shown in FIG. 1) and/or the system 200 (shown in FIG. 2). However, implementations are not limited by FIG. 6, and other examples are also possible. The process 600 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 600 may be described below with reference to FIGS. 1-3, which show examples in accordance with some implementations. However, other implementations are also possible.

Block 610 may include identifying, by a network device, a plurality of paths in a computing network. Block 620 may include the network device storing, in persistent storage, path information based on the identified plurality of paths. Block 630 may include the network device determining a first portion of the path information that is associated with a first host.

Block 640 may include the network device providing the first portion of the path information to the first host. Block 650 may include the first host determining an alternative path to a namespace based on the first portion of the path information. In some implementations, the first host may analyze the first portion to identify alternative paths to namespaces. In other implementations, the network device may determine the alternative paths, and the provided first portion may indicate the alternative paths. In still other implementations, the first host may attempt to access the storage system using each of the paths to validate the accessibility of those paths. After block 650, the process 600 may be completed.

Figure 7:
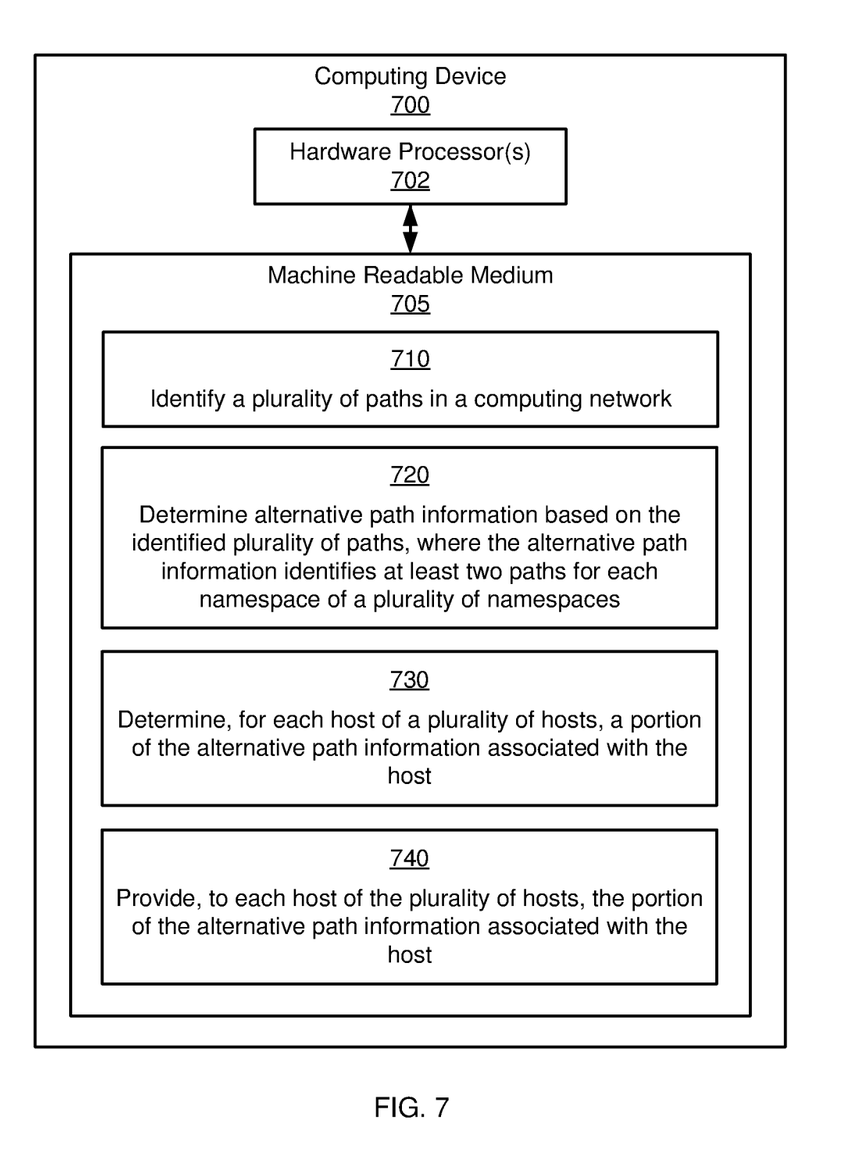
FIG. 7 is a schematic diagram of an example computing device, in accordance with some implementations

Referring now to FIG. 7, shown is a schematic diagram of an example computing device 700. In some examples, the computing device 700 may correspond generally to the network device 210 (shown in FIG. 2). Further, the computing device 700 may provide and/or implement the network service 110 (shown in FIG. 1). As shown, the computing device 700 may include hardware processor(s) 702 and machine-readable storage medium 705 including instructions 710-740. The machine-readable storage medium 705 may be a non-transitory medium. The instructions 710-740 may be executable by the hardware processor(s) 702. The hardware processor(s) 702 may include a general purpose microprocessor, a specialized controller, a processor module or subsystem, a programmable integrated circuit, a programmable gate array, multiple processors, a microprocessor including multiple processing cores, and so forth.

Instructions 710 may be executed to identify a plurality of paths in a computing network. Instructions 720 may be executed to determine alternative path information based on the identified plurality of network paths, where the alternative path information identifies at least two paths for each of a plurality of namespaces. Instructions 730 may be executed to determine, for each host of a plurality of hosts, a portion of the alternative path information associated with the host. Instructions 740 may be executed to provide, to each host of the plurality of hosts, the portion of the alternative path information associated with the host.

Figure 8:
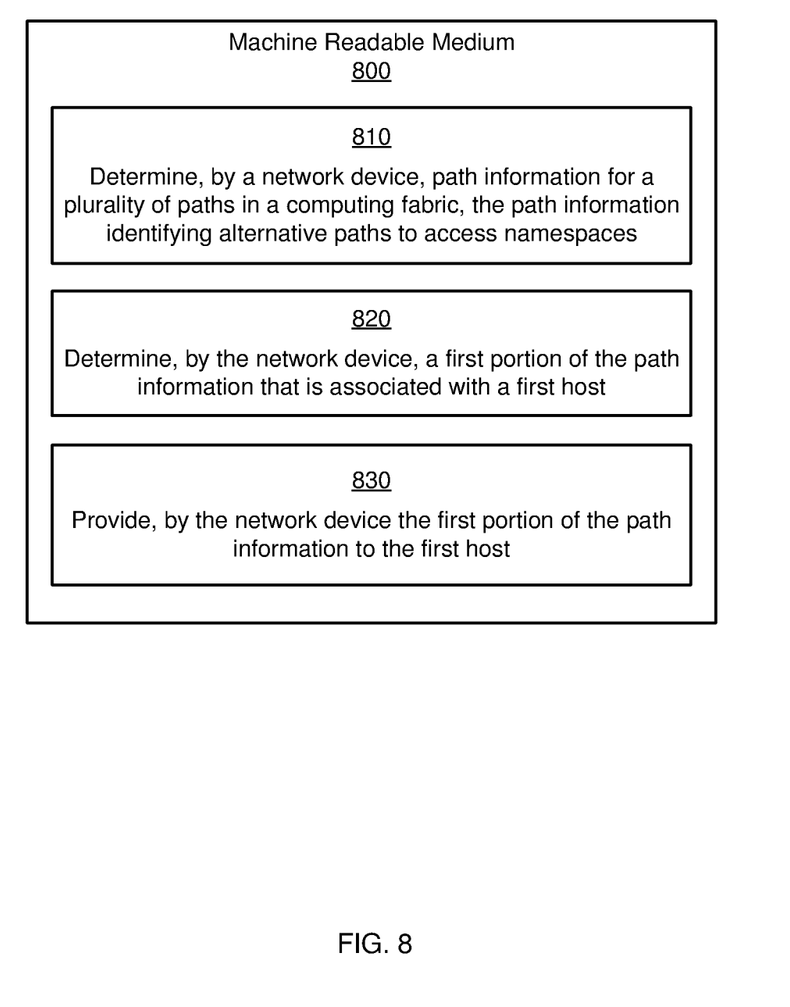
FIG. 8 is a diagram of an example machine-readable medium storing instructions in accordance with some implementations.

Referring now to FIG. 8, shown is machine-readable medium 800 storing instructions 810-830, in accordance with some implementations. The instructions 810-830 can be executed by one or more hardware processors. The machine-readable medium 800 may be a non-transitory storage medium, such as an optical, semiconductor, or magnetic storage medium.

Instructions 810 may be executed to determine, by a network device, path information for a plurality of paths in a computing fabric, the path information identifying alternative paths to access namespaces. Instructions 820 may be executed to determine, by the network device, a first portion of the path information that is associated with a first host. Instructions 830 may be executed to provide, by the network device the first portion of the path information to the first host.

In some examples, implementations may use a NVM Express™ (NVMe™) protocol. In such examples, a NVMe™ server ("NS") may retrieve discovery information for each storage device within a discovery domain or zone. The discovery information may include information sufficient for any host to connect to an NVMe™ subsystem (e.g., NQN names of subsystems and port IDs, interface addresses, etc.). The NS may establish connections to NVM subsystems, and may create an administrator queue to send query commands. The NS may extract controller information and namespace information. The NS may determine the capabilities of the controller.

In some examples, the NS may determine the configuration of the controller by issuing an identify command, which may specify a controller data structure. Further, in some examples, the NS may determine the configuration of the controller for a specific host by issuing a command requesting identifications data that would be reported to that host.

In some examples, the NS may determine the configuration of each namespace by issuing the identify command for each namespace, where the command may specify the namespace data structure. Further, in some examples, the NS may issue the identify command on behalf of a specific host. The NS may determine whether there are any namespaces with the same NGUID. The NS may group the namespaces identified by their NGUID, and may determine information regarding the associated paths.

In some examples, the NS may query each storage system to obtain information about all available controllers and namespaces regardless of host accessibility. The obtained information may allow the NS to build a superset of possible paths. The host may then check a limited set of paths and find out what a specific host could access over those paths.

In some examples, the NS may store the path information in a defined data structure in a database and/or persistent memory. The NS may send portions of the path information to the associated hosts, or the associated hosts can retrieve the path information from the NS. Subsequently, if there are any changes to existing paths, the NS may send change notifications to the associated hosts. The change notifications may be distinct from NVMe™ Asynchronous Event Notifications. In response to a change notification, a host can perform failover procedures to the alternative paths indicated in the path information. A driver of the host can query the NS, and may receive available paths for each namespace that is queried. In this manner, the driver of the host does not have to analyze and identify alternative paths.

Note that, while FIGS. 1-8 show various examples, implementations are not limited in this regard. For example, while some examples discussed herein are implemented using paths to namespaces, it is contemplated that other examples may be implemented using paths to data locations, volumes, blocks, and so forth. Further, referring to FIGS. 1-2, it is contemplated that system 100 and/or system 200 may include additional devices, fewer devices, different devices, different components, different connection paths, different protocols, and so forth. In another example, it is contemplated that each namespace may be associated with any number of network paths. In still another example, each path may include any number or type of devices (switches, ports, connections, and so forth), and the stored path data may include this information. In yet another example, while not shown in each of FIG. 1-8, the devices described above may include additional components, such as memory (e.g., dynamic random access memory (DRAM)), storage devices, buses, switches, batteries, antennas, display devices, input devices, power supplies, and so forth. Other combinations and/or variations are also possible.

In accordance with some implementations, examples may provide a network service to identify paths in a network. In some examples, a network device may discover paths in the network, and may store path information in persistent storage. The network device may determine portions of the path information that are associated with different hosts, and may provide the various portions to their associated hosts. In some examples, using the network device to determine path information may reduce or eliminate the discovery processes performed by each host. Further, in some examples, the network bandwidth associated with determining paths may be reduced, and/or the time to respond to faults in network paths may be improved. In examples described herein, persistent storage may be implemented by any suitable type of non-volatile storage device, such as, for example, a solid state drive (SSD) or flash drive, a hard disk drive (HDD), or the like, or by any suitable combination of a plurality of them.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
 a processor; and
 a storage medium including instructions executable by the processor to:
  identify a plurality of paths in a computing network;
  determine alternative path information based on the identified plurality of paths, wherein the alternative path information identifies at least two paths for each namespace of a plurality of namespaces;
  determine, for each host of a plurality of hosts, a portion of the alternative path information associated with the host; and provide, to each host of the plurality of hosts, the portion of the alternative path information associated with the host.

2. The computing device of claim 1, wherein the computing device is a network switch.

3. The computing device of claim 1, the instructions executable by the processor to:
identify two or more paths to a same namespace; and
include the two or more paths in the alternative path information.

4. The computing device of claim 1, wherein the instructions are executable by the processor to:
generate a path data structure based on the alternative path information; and
store the path data structure in the storage medium.

5. The computing device of claim 1, wherein the path data structure comprises a global ID field, a system field, a port field, a controller field, and a namespace field.

6. The computing device of claim 1, wherein the instructions are executable by the processor to send a first portion of the alternative path information to a first host, wherein the first portion is associated with the first host, wherein the first host selects a first path to a first namespace based on the first portion of the alternative path information.

7. The computing device of claim 6, wherein the instructions are executable by the processor to:
detect a fault in the first path to the first namespace; and
sending a fault notification to the first host, wherein the first host is to select a second path to the first namespace based on the first portion of the alternative path information.

8. A non-transitory machine-readable storage medium storing instructions that upon execution cause a processor to:
determine, by a network device, path information for a plurality of paths in a computing fabric, the path information identifying alternative paths to access namespaces;
determine, by the network device, a first portion of the path information that is associated with a first host; and
provide, by the network device the first portion of the path information to the first host.

9. The non-transitory machine-readable storage medium of claim 8, wherein the instructions cause the processor to:
poll a plurality of devices connected to the computing fabric to generate the path information, wherein the first host does not poll any of the plurality of devices.

10. The non-transitory machine-readable storage medium of claim 8, wherein the instructions cause the processor to:
identify two or more paths from the first host to a first namespace; and
include the two or more paths in the first portion of the path information.

11. The non-transitory machine-readable storage medium of claim 10, wherein the first host selects a first path to the first namespace based on the first portion of the path information.

12. The non-transitory machine-readable storage medium of claim 11, wherein the instructions cause the processor to:
detect a fault in the first path to the first namespace; and
sending a fault notification to the first host, wherein the first host is to select a second path to the first namespace based on the first portion of the path information.

13. The non-transitory machine-readable storage medium of claim 8, wherein the network device is a NVM Express™ (NVMe™) device, and wherein the namespaces are NVMe™ namespaces.

14. A method, comprising:
identifying, by a network device, a plurality of paths in a computing network;
the network device storing, in persistent storage, path information based on the identified plurality of paths;
the network device determining a first portion of the path information that is associated with a first host; and
the network device providing the first portion of the path information to the first host.

15. The method of claim 14, further comprising:
the first host determining alternative paths based on the first portion of the path information.

16. The method of claim 14, further comprising:
the network device determining a plurality of alternative paths based on the path information, wherein the first portion of the path information indicates the plurality of alternative paths.

17. The method of claim 14, further comprising:
the first host storing the first portion of the path information in a storage; and
the first host selecting a first path to a first namespace based on the first portion of the path information.

18. The method of claim 17, further comprising, after a selection of the first path by the first host based on the first portion of the path information:
the network device detecting a fault in the first path; and
the network device sending a fault notification to the first host.

19. The method of claim 18, further comprising:
in response to a receipt of the fault notification, the first host selecting a second path to the first namespace based on the first portion of the path information.

20. The method of claim 14, wherein identifying the plurality of paths comprises:
the network device polling a plurality of devices in the computing network, wherein the first host does not poll any of the plurality of devices.

* * * * *